Figure 1:
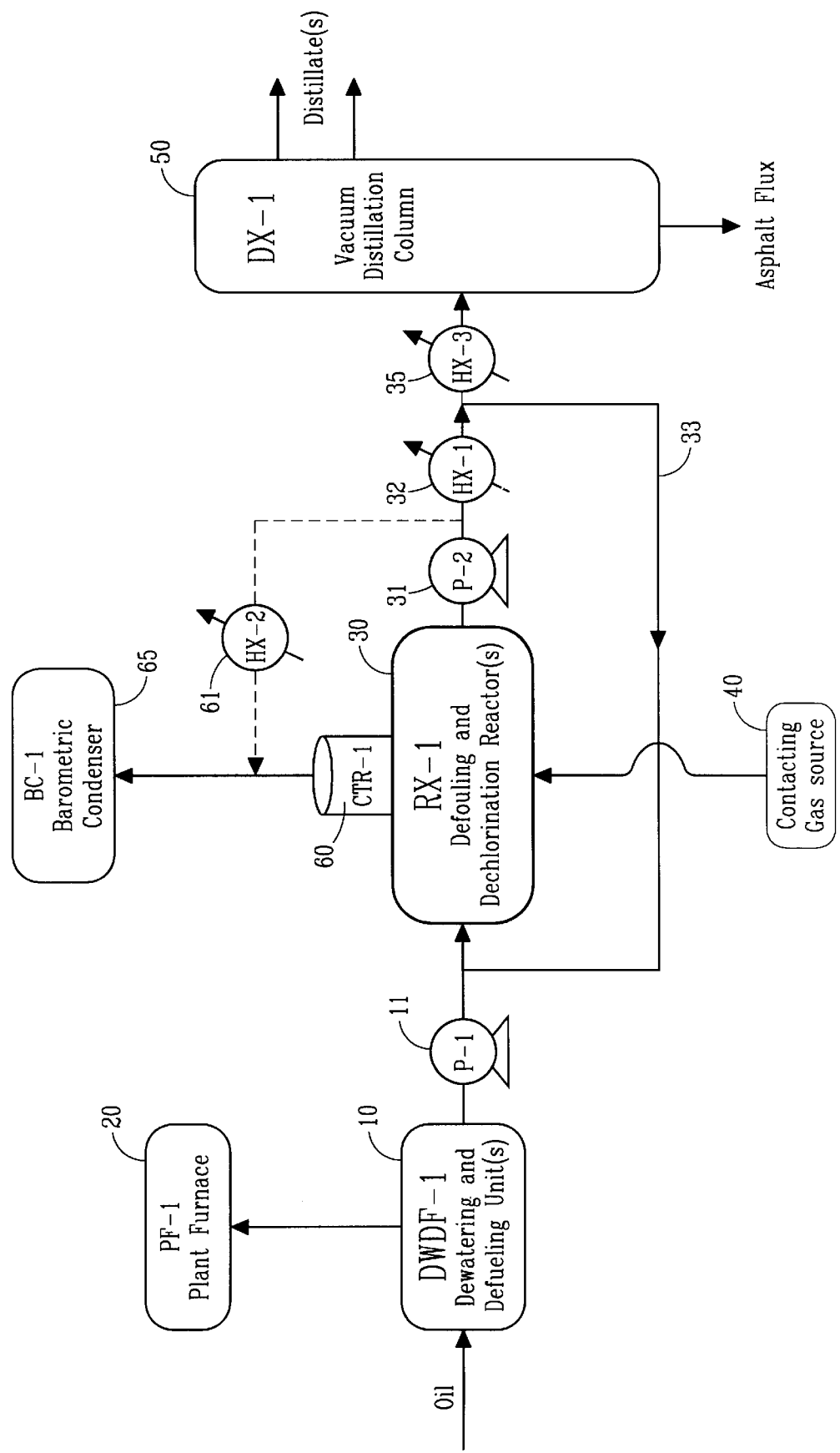

United States Patent [19]

MacDonald et al.

[11] Patent Number: 6,106,699
[45] Date of Patent: Aug. 22, 2000

[54] PROCESS FOR DE-CHLORINATING AND DE-FOULING OIL

[75] Inventors: Martin R. MacDonald, Plano; Alexander D.B. Daspit, Dallas; Thomas G. Murray, Aubrey, all of Tex.

[73] Assignee: Probex, Carrollton, Tex.

[21] Appl. No.: 09/067,031

[22] Filed: Apr. 28, 1998

Related U.S. Application Data

[60] Provisional application No. 60/045,065, Apr. 29, 1997.
[51] Int. Cl.$^7$ .................................................. C10M 17/00
[52] U.S. Cl. ......................... 208/179; 208/184; 208/48 R
[58] Field of Search ................................. 208/184, 179, 208/48 R

[56] References Cited

U.S. PATENT DOCUMENTS

| | | |
|---|---|---|
| 3,923,643 | 12/1975 | Lewis . |
| 3,990,963 | 11/1976 | Audibert . |
| 4,033,859 | 7/1977 | Douglas . |
| 4,071,438 | 1/1978 | O'Blasney . |
| 4,381,992 | 5/1983 | Wood et al. ............................. 208/179 |
| 4,762,797 | 8/1988 | Dickakian ................................. 436/60 |
| 4,941,967 | 7/1990 | Mannetje et al. ....................... 208/184 |
| 5,286,380 | 2/1994 | Mullen .................................... 208/180 |
| 5,688,335 | 11/1997 | Krabbenhoft . |

*Primary Examiner*—Helane Myers
*Attorney, Agent, or Firm*—Liniak, Berenato, Longacre & White

[57] ABSTRACT

The invention is directed to a process of reducing the chlorine content of oil as well as its propensity to foul during subsequent distillation processes. The process heats the oil to a temperature in the range of 400 to 700 F and contacts the oil with a non-oxidizing gas, such as steam, for a residence time of at least several minutes. Thereafter the oil may be distilled and/or finished to a base lubricating oil or other distillate product. The oil subject to the process may be used oil, and can be subject to a dewatering or removal of light contaminants treatment prior to being subject to the process.

42 Claims, 4 Drawing Sheets

PROCESS FOR DE-CHLORINATING AND DE-FOULING OIL

This application is entitled to the benefits of provisional application Ser. No. 60/045,065 filed Apr. 29, 1997.

FIELD OF THE INVENTION

The invention relates to the field of re-refining used oils. More specifically, the invention relates to dechlorinating and reducing the fouling tendency of oils to a level consistent with packed column distilation.

BACKGROUND

A number of processes have been proposed to re-refine used oils. Any successful used oil re-refining process must satisfactorily address the profound tendency of used oil to foul high temperature heat exchanger surfaces and distillation columns. Most commercially successful processes heretofore have dealt with this fouling issue by eliminating high temperature shell and tube heat exchangers and conventional vacuum columns altogether in processing undistilled used oil at elevated temperatures beyond about 500 F, and instead employ wiped or thin film evaporators in their place, not withstanding the well known performance shortcomings of this sort of distillation apparatus. These shortcomings include their mechanical complexity, inability to take side draws, and inability to distill with more than one theoretical plate in a single step. U.S. Pat. No. 4,941,967 represents an exemplary process.

Other prior art processes have sought to deal with the fouling issue by employing some pretreatment modality which seeks to address factors presumed to be the key source of fouling in used oil prior to high temperature vacuum distillation in a substantially conventional vacuum column or its exposure to high temperature shell and tube heat exchangers. U.S. Pat. Nos. 5,286,380, 4,381,992, and 5,306,419 represent exemplary processes. The commercial experience of these processes indicates that these efforts have not heretofore been fully successful. Accordingly, the fouling issue may be more complex and multi-faceted than previously thought, particularly when a wide range of used oils must be processed. In the end, no prior art process has successfully reduced the fouling tendency of used oils to a level consistent with reliable trouble free subsequent distillation in a packed distillation column.

In addition, most prior art re-refining processes have considerable difficulty in processing used oils, such as used metalworking oils, which are high in chlorine due to the presence of chlorinated paraffins. These difficulties stem from the corrosion generally resulting therefrom, the incompatibility of elevated chlorine levels with downstream processing units such as hydrofinishers, and the unacceptability of elevated chlorine levels in most prospective finished re-refined products, such as distilled fuels or re-refined base oils.

SUMMARY OF THE INVENTION

An object of the invention is to reduce efficiently and cost effectively the fouling tendency of used oil to a level consistent with subsequent distillation in a packed distillation column under moderate vacuum and steam drive.

A further object of the invention is to efficiently and concurrently remove the great majority of chlorine from used oils containing chlorinated paraffins, thereby enhancing their value as a fuel and facilitating downstream processing.

PROCESS DESCRIPTION

A basic embodiment of the invention is schematically illustrated in the accompanying exhibit captioned "FIG. 1". For the sake of clarity and simplicity, certain pumps, heaters, piping details, etc. which would be employed in the process and whose location and mode of operation would be within the scope of those schooled in the art have been omitted, as have the subsequent downstream processing steps which would be or could be practiced on the effluent streams.

Used oil enters on the left and optionally but preferably passes through de-watering and de-fueling unit 10 ("DWDF-1"). This unit preferably removes the bulk of the water, light fuel boiling below about 300 F, and at least a portion of certain commercial cleaning solvents and antifreeze glycols which often contaminate used oil. These byproducts typically have the lowest commercial value and, in the case of the water, the highest disposal costs, and are preferably burned (without condensation when separated by flashing or distillation means, as in the preferred mode discussed below) in the facility's furnace, where they can meet the bulk of the plant's fuel requirement. Alternatively or in addition, a portion may be directed to a gas turbine generating system to produce electric power needed by the plant, with any surplus available for sale.

DWDF-1 is preferably a single stage atmospheric or vacuum flash unit, or two stage flash (atmospheric followed by vacuum) unit, with feed heated all or in part via conventional indirect heat exchange (such as via conventional shell and tube heat exchanger(s)) with oil cooling later in the process (such as after vacuum distillation). However, as the oil remains highly subject to fouling, the skin temperature of such exchangers is preferably maintained below about 400 F, or such other temperature at which the oil would begin to foul, or alternatively double banked and equipped with commercially available closed loop cleaning systems to enable continuous plant operation notwithstanding exchanger fouling. Fouling of exchangers exposed to fouling prone used oil at temperatures above about 300 F may be further mitigated by maintaining a high rate of turbulent flow through the exchangers though appropriate design practices well known to those schooled in the art, including aggressive pumparounds on the used oil side of the exchangers. In the preferred mode, overheads from DWDF-1 are directed to plant furnace 20 ("PF-1"), where they are burned without condensation to meet the bulk of the facility's fuel requirement, with supplemental fuel provided to PF-1 for flame stabilization as required. As the defouling and dechlorination reactor unit 30 ("RX-1") which follows will incidentally remove water and light fuel from the oil, this initial DWDF-1 unit may optionally be omitted.

Following DWDF-1 if employed, or otherwise directly from used oil storage, the oil is pumped via a pump 11 ("P-1") or otherwise passes into RX-1 via a pipe or other conduit. As within DWDF-1, this conduit may include conventional indirect heat exchange with oil cooling later in the process, however as the oil remains highly subject to fouling, the skin temperature of such exchangers is still preferably maintained below about 400 F, or such other temperature at which the oil would begin to foul, and pumparounds should be employed beyond about 300 F. Commercially available chemical anti-foulants such as Nalco/Exxon Energy Chemicals LP EC5425A and 94BU260 are preferably added to the oil at this stage at vendor recommended parts per million levels, or may alternatively be added within DWDF-1, if this unit is included.

RX-1 comprises a large vessel or sequence of vessels designed to provide residence time for the oil in contact with a stream of gas from Gas Source 40 at elevated temperatures above 400 F, and serves via means of this residence time and contact to substantially de-chlorinate the oil and render it essentially impervious to fouling. Very good results have been achieved in laboratory trials with the oil in RX-1 maintained at 525 F and this is currently the preferred temperature, however other temperatures as low as about 400 F and as high as about 700 F may also provide satisfactory results. Temperatures below about 400 F are unlikely to provide appreciable de-chlorination or de-fouling of the oil, and temperatures above about 700 F are likely to result in excessive cracking of the oil.

Final heating of the oil to be treated in RX-1 to treatment temperature is preferably achieved via direct heat exchange with the oil already present in RX-1, to avoid the fouling which would result from exposing the still highly fouling prone incoming oil to RX-1 treatment temperatures on the metal surface of a heater or heat exchanger. In the embodiment illustrated in FIG. 1, the oil enters RX-1 into a re-circulation loop 33 downstream of a heater, such as the re-circulation loop employing pump 31 ("P-2") and heater 32 ("HX-1") shown. If the oil entering this re-circulation loop enters at a temperature below the temperature of the oil therein, it will be essentially instantaneously heated via direct heat exchange to nearly the temperature of the oil therein. A bleed stream consistent with the desired average residence time within RX-1 may also be taken downstream of P-2 from which oil may be directed to storage or to immediate downstream processing, such as vacuum distillation via furnace heater 35 ("HX-3"), which would preferably heat the oil to preferred vacuum distillation temperatures in the range of 650 F, and vacuum distillation column 50 ("DX-1"), which would preferably be of packed design, employing steam drive and flash zone vacuum in the 10 mm to 100 mm Hg range.

Within RX-1, as noted above, the oil is maintained at elevated temperatures above 400 F and exposed to a stream of gas. In principle, any gas/liquid contacting mechanism or system known in the art, or combination thereof, can be employed in RX-1 if the fouling characteristic of the used oil is taken into account. For example, bubble columns, cascade systems, packed columns, plate towers, or even spray chambers can be used.

Preferably, however, RX-1 is a vessel or other contained volume with liquid in the continuous phase, though which gas passes at least in part in the form of bubbles. Small bubbles are preferred to maximize surface area in relation to volume and to reduce the rate of bubble rise and thus increase their residence time and maximize the contact between the gas and oil at a given level of gaseous flow. In addition, dispersion of bubbles substantially thoughout RX-1 is preferred, to increase the proportion of contained volume that is effectively treated. Accordingly, RX-1 preferably contains one or more gas dispersing apparatus such as spargers, jets, diffusers, or agitators, all designed to assure good bubble dispersion and maintain comparatively small bubble size. These apparatus may also be included in any re-circulation loop associated with RX-1. Such a re-circulation loop gas/liquid contactor may include impingement aerators adapted for use with the appropriate gas, pipeline contactors, or venturi nozzles. The re-circulation pump itself may also be a gas/liquid contactor if operated within its cavitation limits.

A high shear agitation system may also be included within RX-1. Such a shear agitation mechanism would tend to break up bubbles and thereby offset the tendency of bubbles to coalesce to larger size bubbles, and may include, for example, high velocity re-circulation pumps. Sonic or ultrasonic transducers may also be included within RX-1 if desired to break up bubbles and to promote cavitation and mixing.

Excellent results have been achieved in lab trials with steam (derived from heating water) as the gas, but it is believed that many substantially non-oxidizing gases—including without limitation nitrogen, hydrogen, methane, ethane, and ammonia—may also provide satisfactory results. Air and other gases containing a significant amount of free oxygen are not acceptable, because of their unfavorable oxidation effect on oils at elevated temperatures. Similarly, gases such as chlorine or fluorine are unacceptable. Steam is the preferred gas given its low cost, ease of generation, and excellent performance. Excellent results have been achieved in lab trials with steam superheated to 425 F and this or higher steam temperatures are presently preferred, although given that the steam and oil temperatures will rapidly equilibrate via direct heat exchange, it is believed that somewhat lower steam temperatures will also provide satisfactory performance.

It is believed that the sustained thermal treatment within RX-1 causes the initially unstable components of the oil which could form tenacious fouling deposits to decompose in its benign oil bath environment, rather than on subsequent heat exchanger or column surfaces where they could cause fouling, and that the stream of gas concurrently acts as a transport medium to rapidly remove from the oil vaporous, highly unstable decomposition products such as HCL which could further damage the oil and make it susceptible to renewed fouling if not immediately removed. In addition, thermal energy alone may cause a reversible reaction in which a chemical equilibrium is established. Thus, when thermal treatment is employed alone, certain light reaction products are formed from fouling susceptible antecedents, but once formed may tend to recombine to regenerate the original molecule. The stream of gas may remove light reaction products from the liquid phase and drive the reaction further in the direction of completion. Finally, when the preferred gas—steam—is employed, hydroxyls or hydrogen from the steam are thought to fill certain unstable open bonds and to reduce the ultimate concentration of unsaturates and incompatible asphaltenes (the role of incompatible asphaltenes in the fouling of oils is discussed in detail in U.S. Pat. No. 4,762,797, which is incorporated herein by reference) which can also lead to further fouling. To achieve these benefits, it is not necessary to pre-distill the light oil components from the oil in a steam stripping operation; only the vaporous decomposition products need be removed, allowing the valuable light lubricating oil components to be fully subjected to the anti-fouling and dechlorination treatment and preserved for base oil finishing.

It is believed that significant benefits accrue from treatment of the oil in RX-1 within a period of time as short as several minutes. However, much longer treatment intervals are presently preferred. A three hour residence time has given excellent results in batch laboratory trials, and is presently the most preferred average residence time for production designs.

A relatively long average residence time is particularly desirable in a continuous flow unit which does not closely approach plug flow, as would normally be employed in a production design as is schematically illustrated in FIG. 1. This is because the minimum residence time, experienced by a molecule moving relatively directly from the inlet to the outlet of RX-1, is expected to be an important determinant of the tendency of that molecule to foul on the re-circulation heat exchanger or on heat exchanger surfaces and column internals associated with downstream distillation equipment. An adequate minimum residence time is most readily achieved when the average residence time is comparatively longer. The preferred design of RX-1 in a continuous flow configuration is a compromise between on the one hand achieving the greatest possible minimum residence time for a given average residence time through vortices, baffles, and other design optimizations which strive to approach plug flow from inlet to outlet, while on the other hand maintaining turbulent flow in all associated piping and heat exchangers to minimize deposition of any decomposition products that may arise therein.

Because the anti-fouling and de-chlorination benefits of RX-1 require residence time to achieve, and are most preferably achieved on substantially the entire oil after de-watering and de-fueling, and not just on the heavier components thereof, it is preferred to provide means to retain therein the bulk of the lighter components of the oil which the gas and heating would otherwise strip overhead. It has been found satisfactory, in a laboratory configuration where steam is employed as the gas, to place a short (eight inches has been used to good effect with a two liter vessel) packed column on RX-1 through which substantially all gases and vapors must pass, and then setting the crossbar temperature of the column, through passive (removal of insulation) and active (blowing compressed air thereon) means, at just above the boiling point of water. This permits steam to pass essentially unhindered from the vessel, while causing most of the lighter components of the oil, which have nonetheless a higher boiling point than water, to condense therein and reflux back into the vessel To achieve similar ends in a production system, it is presently preferred that RX-1 be a pressure vessel or vessels, operating at between about 10 and 75 psig, with an overhead contactor 60 or short column thereon, such as the CTR-1 shown, having at least one theoretical stage, through which vapors flow. Further, it is preferred that the contactor 60 or column be refluxed with cooler oil. In this embodiment, this reflux is provided by treated oil drawn from the outlet of RX-1, as represented by the dotted line in FIG. 1, and cooled, preferably to a temperature between 300 F and 500 F (as by shell and tube heat exchanger 61 ("HX-2"), which preferably also contributes heat to oil earlier in the process), prior to its use as reflux.

Higher pressures beyond 75 psig can be used for RX-1, but present some risk of polymerization of the oil. Indeed, polymerization is visibly apparent under certain protocols beyond about 50 psig. In addition, it is not presently thought that the additional cost of higher pressures would be economically justified by the small amount of additional oil that could be retained therein.

Contactor or column CTR-1 is susceptible to fouling from the reactive vapors emerging from RX-1, and preferably employs one of several low fouling designs well known to those schooled in the art, such as grid packing, teflon packing (bearing in mind its temperature limitations), so-called "shower deck" baffle plates, or simply one or more downwardly oriented spray nozzles through which cooler reflux oil is pumped, without packing or other internal structure.

Subject to the characteristics of the used oil being processed, the gases passing through CTR-1 may include material quantities of acid gases such as HCL which become extremely corrosive on condensation, it is preferred that the vapor stream passing through CTR-1 be directed to barometric direct contact condenser 65 ("BC-1") where it can be essentially instantaneously cooled to the condensation point of said acid gases via direct heat exchange with cooled re-circulating water containing pH neutralizing amines. Alternatively, other corrosion resistant condensing systems, such as fluoropolymer or fluoropolymer lined condensers, may be employed, or subject to the characteristics of the used oil being treated, conventional condensers may be employed. Following BC-1, the condensed oil can be separated from the condensed and re-circulating water employing a gravity separator or other conventional means.

Further post processing can then be performed on the water and oil streams from BC-1 as appropriate. For example, if desired when steam is employed as the treating gas, as preferred, the excess cooled re-circulating water, corresponding to the condensed steam, can be treated to the requisite standards for boiler feed, and employed as boiler makeup water, substantially eliminating the plant's dependence on outside water or water disposal. The small amount of oil passing through contactor CTR-1, after separation from the steam or other gas employed in RX-1 via said barometric condenser BC-1 and other conventional means, is generally suitable for sale as a fuel, either as is or after blending. However, if desired to reduce the volume of overhead oil or to subject the overheads to additional treatment time, a portion of the condensed overheads may be returned to CTR-1 as additional reflux or directly to RX-1. Of course, if this is done, CTR-1 must be sized appropriately for the additional volumes of material which shall pass through CTR-1. An outlet also must be provided to enable the ultimate exit of oil not passing though CTR-1 again, although the primary outlet for RX-1 may suffice if RX-1 is substantially mixed.

In addition, or alternatively, all or a portion of this overhead oil may be subjected to additional treatment in a small dedicated vessel (not illustrated), which vessel, to achieve the desired residence time for the light oil components, could employ even higher pressures or solely employ thermal treatment without gas, which generally provides satisfactory de-fouling and de-chlorination performance for the light oil components. We have found, that the light oil components separated overhead in RX-1 are less susceptible to polymerization than the body of the oil, and may, for example and without limitation, be satisfactorily post-treated for three hours at 150 psig at a temperature of 650 F, without gas treatment. A small amount of carbonaceous particulate is formed when these treatment conditions are employed, which can be readily separated by any number of conventional means, such as gravity settling in a dedicated receiving tank or vacuum flashing wherein the overhead product is sold as fuel and the bottoms are combined with the main oil stream after RX-1, or later in the process. Gas treatment may further enhance overhead oil treatment.

Following treatment in RX-1, the outlet oil is substantially completely freed of the chlorine associated with chlorinated paraffins and unable to rapidly form substantial tenacious fouling deposits. Tenacious fouling deposits are defined for all purposes herein as fouling deposits that continue to adhere to a heated surface following a mild fluid rinse. Although laboratory tests indicate that a light, loosely adhering, mucous like material may still form on high temperature surfaces with some oils, it is easily removed with light fluid flow such as the turbulent flow that would be employed in all downstream heat exchangers and the reflux spray that would be employed over column packing.

Accordingly, the oil following RX-1 is suitable for any purpose to which dechlorinated, defouled oil may be put, including direct use as a fuel, or a number of downstream conventional processes. Particularly preferred is its distillation in a packed vacuum column such as DX-1, which preferably employs steam drive and conventional means such as sprayed reflux over each packing bed to wash down any loosely adhering deposits. DX-1 would ordinarily follow conventional heating methods and mechanisms, such as furnace heater HX-3 (which is preferably a part of light fuel, solvent, and glycol burning plant furnace PF-1), to elevate it to the desired vacuum distillation temperature, unless the processing within RX-1 itself is conducted at suitable vacuum distillation temperatures. HX-3 preferably employs turbulent flow and other known means, such as convection heating wherein the flames of the furnace indirectly heat air which in turn heats the outside of the furnace tubes, to limit surface temperatures and prevent the appearance of hot spots, which could lead to coking or fouling even in processing oil treated by the process of this invention. As is well known to those schooled in the art, HX-3 may beneficially incorporate re-boiler and re-circulation means for a portion of the asphalt flux from DX-1.

Following such distillation, as is well known to those schooled in the art, the overhead and side draw oil is almost completely de-metallized as well as being de-chlorinated and de-fouled, and is well suited to such purposes as a demetallized distillate oil can be put, including immediate use as a deashed distillate fuel, as feed to a fluid catalytic cracker, or finishing of the lube fraction thereof, as in a hydrofinisher, to a base oil suitable for reuse in formulated lubricants. Particularly preferred is finishing the portions of the distillate oil in the desirable base lubricating oil boiling ranges (e.g. above about 650 F atmospheric equivalent boiling point per ASTM D-1 160) to base oil via the solvent extraction process of our co-pending application, Ser. No. 08/925,279, filed Sep. 8, 1997.

Figure 2:
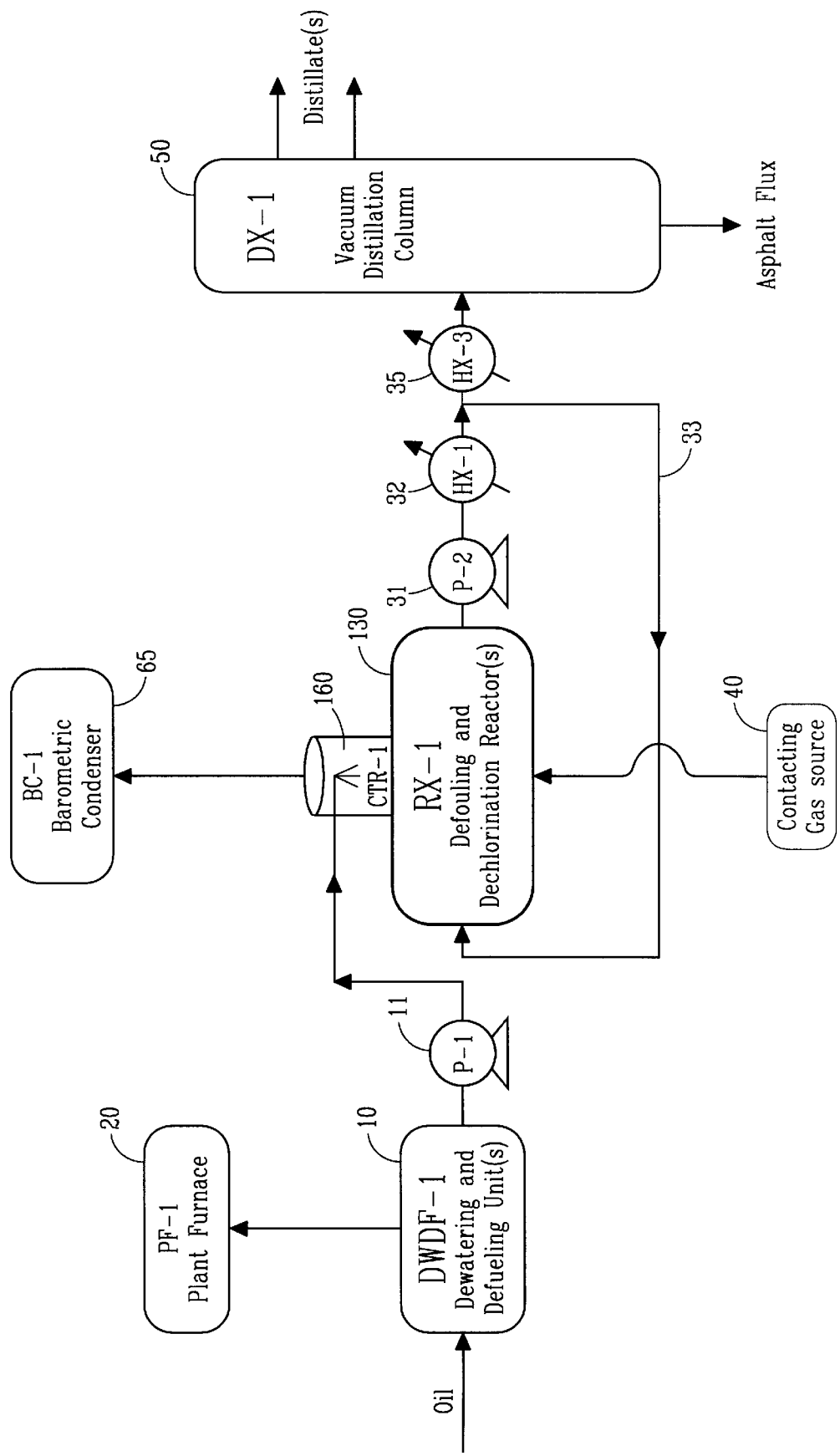

In an alternative embodiment of the invention, oil incoming to RX-1 from DWDF-1 is fed as reflux to CTR-1 rather than injected in the heater re-circulation loop. This alternative embodiment is illustrated in FIG. 2. Refluxing CTR-1 (160) with incoming oil eliminates the need for the HX-2 (61) set forth in FIG. 1, which is omitted from FIG. 2, because the incoming oil is typically already cooler than treatment reactor temperatures. In addition, it allows RX-1 to more closely approximate plug flow, because of reduced recycle of oil from the outlet to the inlet. However, in this configuration, CTR-1 is susceptible to fouling from both the incoming oil untreated oil and from reactive vapors emerging from RX-1 (130). Accordingly, a robust fouling resistant design for CTR-1, such as downwardly oriented spray nozzles through which the incoming oil is pumped, without internal structure or optionally with "shower deck" baffle plates comprised of fouling resistant material such as titanium, is particularly important.

Figure 3:
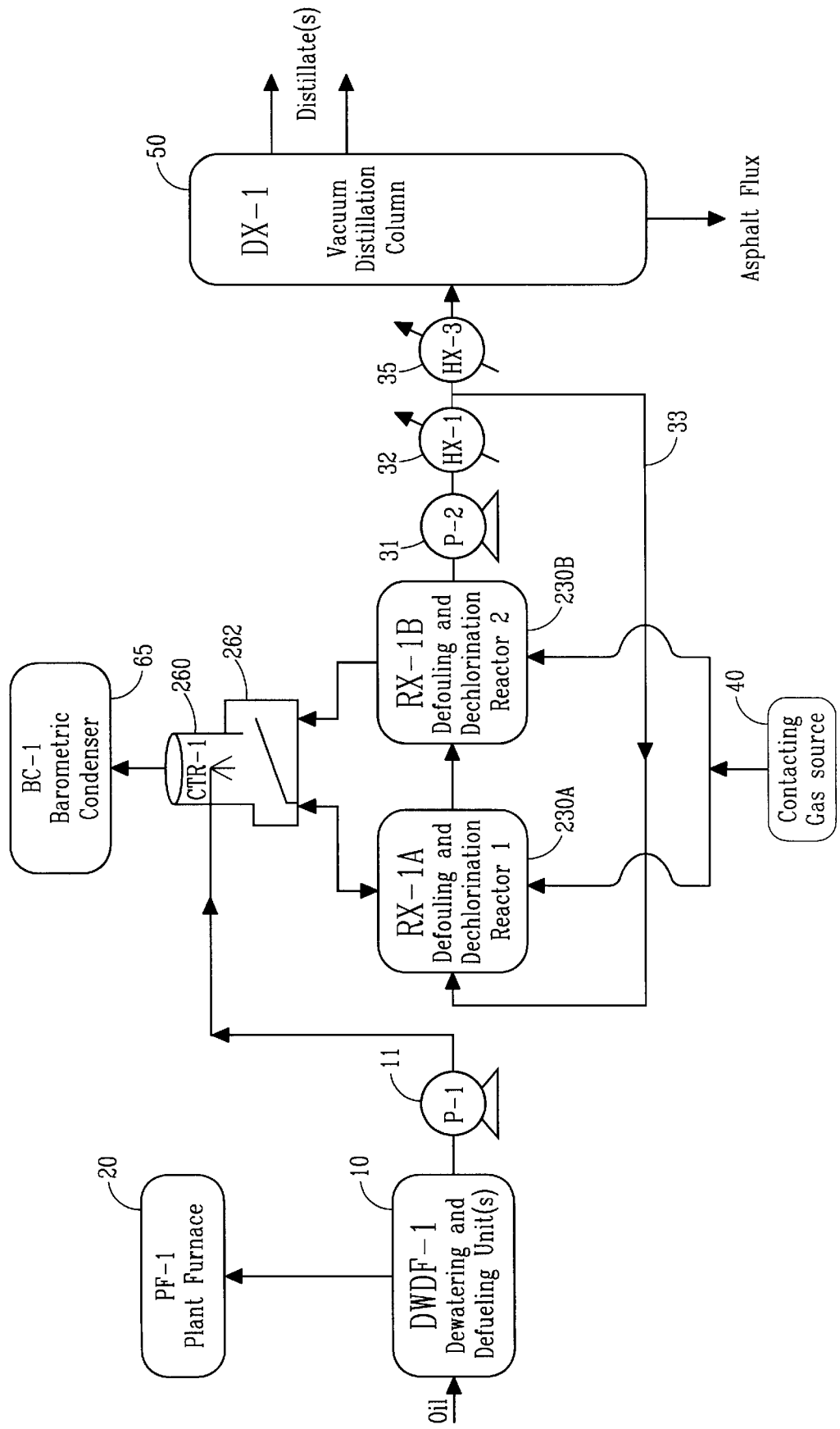

In a second alternative embodiment of our innovative process, RX-1 is constructed of two or more sequential vessels piped together, and served by a common pump and heat exchanger re-circulation loop. This configuration is illustrated in FIG. 3, wherein the first sequential vessel is labeled RX-1A (230A) and the second sequential vessel is labeled RX-1B (230B). As in the embodiment illustrated in FIG. 2, the embodiment illustrated in FIG. 3 directs incoming feed as reflux to CTR-1 (260). CTR-1 is preferably implemented in this configuration with internal structure 262 to admit vapors from both RX-1A and RX1-B, and to direct all incoming oil and condensation to the top of RX1-A. This allows the RX1-A/RX1-B system to more effectively approach plug flow. If, on the other hand, cooled treated oil is employed to provide contactor reflux in a multiple reactor configuration, as in the embodiment of FIG. 1, plug flow will be more closely approached if CTR-1's internal structure directs all condensate to the final reactor in the sequence.

Figure 4:
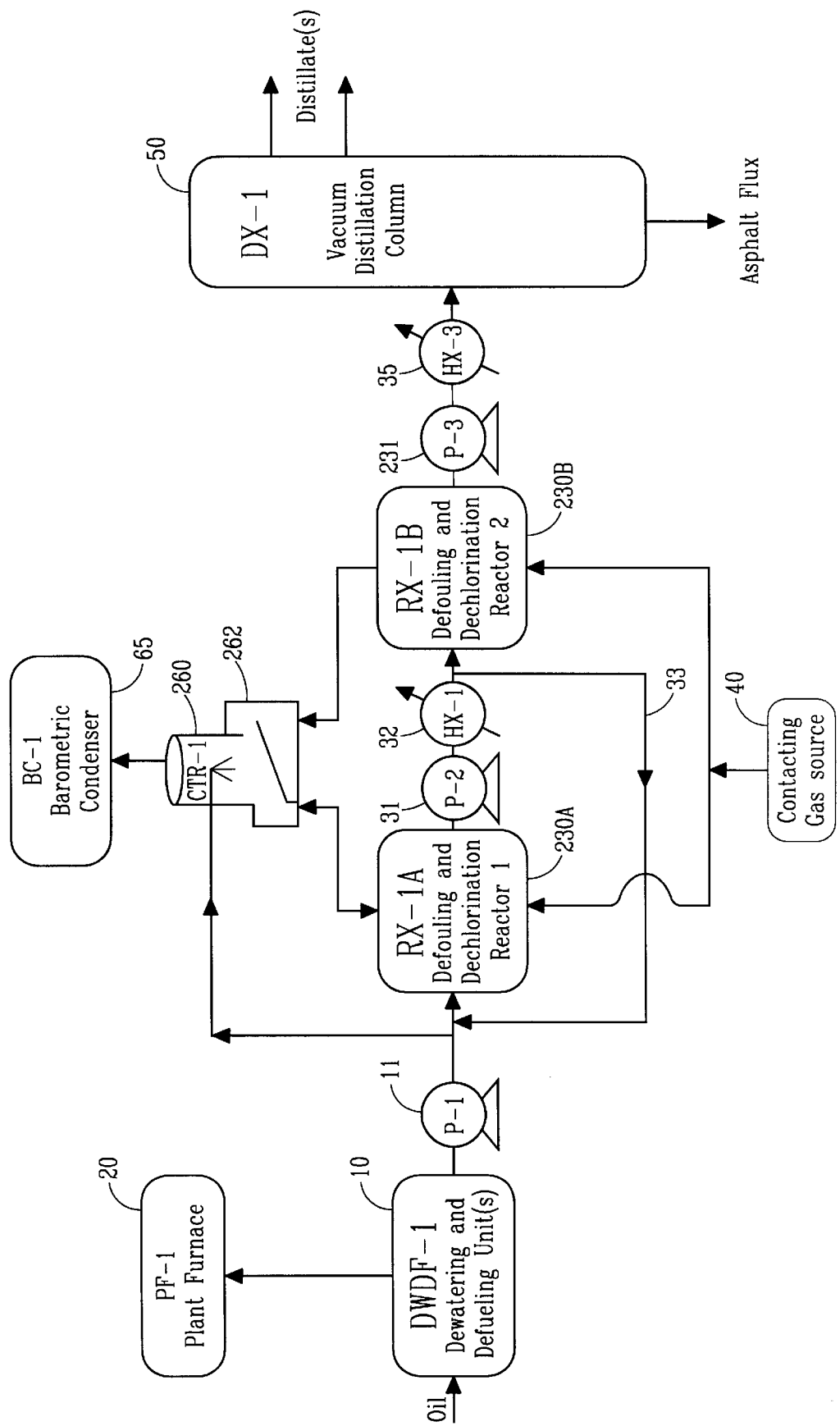

Alternatively, when multiple sequential vessels are employed for RX-1, the re-circulation loop 33 may serve simply the initial vessel(s), with the remainder in a passive quasi-plug flow configuration to provide additional residence time on the bleed stream directed to additional downstream processing. This variation is illustrated in FIG. 4.

Alternatively, if desired, multiple vessels comprising RX-1 may be operated at progressively higher temperatures from original inlet to ultimate outlet, however, this necessitates a separate pump and heat exchanger re-circulation loop for each vessel, and the cost of this is not presently thought to justify any additional fouling reduction benefits achieved. This variation is not illustrated.

LABORATORY PROCEDURE

The following procedure illustrates certain aspects of the invention discussed above. The preferred gas, steam, is employed, and dewatering and defueling are accomplished concurrently with thermal and steam treatment.

Stage 1: Thermal and Steam Treatment

A three necked, two liter, angle necked flask is employed for RX-1 in this procedure, which is performed on a batch basis. Steam is generated by a Sussman Model IMBA3 electric boiler, piped to the flask through a coiled tube of galvanized steel, and superheated to 425 F by electric heat tape wound around the steel tube. The steam is introduced into one of the two side necks of the flask through a glass "aeration tube" with multiple small apertures arranged about a roughly ½ inch diameter ball at its distal end, Ace Glass catalog # 5295-14, with a ground glass joint providing a gas tight seal with the flask neck, and sized to place the distal end just above the bottom of the flask. The remaining side neck contains a thermometer, placed within a ground glass joint adapter to achieve a gas tight seal, and with immersion sufficient to place the thermometer bulb entirely below the surface of the oil placed within the flask. The center neck contains an eight inch Hempel distillation column, Ace Glass catalog #6572-02, packed with 0.16" 316 stainless steel PRO-PACK distillation packing, and fitted at the top with a glass distillation crossbar and crossbar thermometer, feeding an Allihn condenser. The flask is heated by upper and lower electric mantles under variable thyristor control.

1000 to 1500 grams of used oil is added to this vessel through one of the necks prior to final assembly of the apparatus, and is heated therein as rapidly as possible to 525 F and maintained at that temperature for three hours, with steam feed initiated at approximately 250 F and maintained throughout. The oil is then cooled by blowing air on the outside of the vessel, and decanted once its temperature declines below about 300 F.

The quantity of steam feed does not appear critical, although tests with larger apparatus indicate that steam dispersion and bubble size can be significant considerations. In the two-liter vessel, equally satisfactory results were achieved at approximately 100 and approximately 200 grams per hour. Higher rates were also satisfactory but wasteful of steam. In that, with laboratory equipment the great bulk of steam employed appears to pass through the oil without reacting with it, it is expected that, in production scale equipment, materially lower rates of steam in relation the volume of oil will prove adequate because of the longer steam contact time provided by the much larger vertical column of oil in a production vessel.

As the major objective of this process is to thermal and steam treat, rather than pre-distill, the oil, the distillation crossbar temperature is maintained just above 212 F in the laboratory configuration by adjusting the degree of insulation and airflow on the column, so that, although uncondensed steam and vaporous cracking and reaction products pass through the column essentially unimpeded, substantially all the light oil refluxes back into the flask and is subjected to the entire treatment cycle. This causes substantially all the chlorinated parafinn content of the oil as well as certain other chlorinated compounds to be dechlorinated, and permits substantially the entire oil to be precisely fractionated in downstream distillation apparatus, if desired, rather than imperfectly separated in RX-1 with its small contactor or column.

Minor variations of this procedure, with different used oil feeds, generally comparable equipment with flask capacities up to 17 liters, and differences in the ratio of steam flow to oil volume which are believed to be inconsequential, elicited the following fouling test results on the treated oil. The treated oil's propensity to foul was measured on the Alcor Thermal Fouling tester, employing a 750 F tube temperature, a one cc per minute flow rate, and a three hour test cycle. The Alcor Thermal Fouling Tester is an adaptation of the Alcor Jet Fuel Oxidation Tester described in ASTM Vol. 50 D-3241, and measures the increase in tube weight—a proxy for the weight of tenacious fouling deposits formed on the tube—following a defined test cycle in which fluid is pumped at a uniform rate past a heated tube maintained at a uniform temperature, and the tube is cooled and lightly rinsed manually with heptane. The change in fluid temperature exiting the test cell is also measured, and provides an indication of the change in heat transfer efficiency over the course of the test. As the flow rate is extremely low, and there is no rinse prior to temperature measurements, the temperature measurements measure the combined effect of both tenacious and lightly adhering deposits. The test is offered by Alcor Petroleum Instruments, 919 Isom Road, San Antonio, Tex., and is sometimes referred to by Alcor as an "Antifoulant test using the Alcor HLPS". The 750 F temperature was selected because it is well above the temperature levels normally thought to initiate coking and fouling in used oils. Moreover, oils which do not foul at such temperatures should be readily compatible with downstream distillation in a distillation column at moderate flash zone vacuums in the 10 to 100 mm Hg range, such as in a packed column with steam drive. As will be immediately recognized by those schooled in the art, such distillation apparatus has numerous advantages for production scale distillation of lubricating oil range oils when fouling is not a significant factor.

The effectiveness of this procedure in reducing fouling across a spectrum of used oils is illustrated by the following comparisons:

| Sample | Thermal Fouling Test Tube Weight Gain | | Thermal Fouling Test Delta T (F.) | |
| --- | --- | --- | --- | --- |
| | Unprocessed Oil[1] | Defouled Oil | Unprocessed Oil[1] | Defouled Oil |
| Crankcase | | | | |
| Oil # 1 | 154.6 mg[2] | 0.1 mg | 110° F.[2] | 3° F. |
| Oil # 2 | 65.7 mg | 0.3 mg | 55° F. | 2° F. |
| Oil # 3 | 152.6 mg | 0.3 mg | 55° F. | 2° F. |

-continued

| Sample | Thermal Fouling Test Tube Weight Gain | | Thermal Fouling Test Delta T (F.) | |
| --- | --- | --- | --- | --- |
| | Unprocessed Oil[1] | Defouled Oil | Unprocessed Oil[1] | Defouled Oil |
| Metalworking | | | | |
| Oil # 1 | 82.4 mg | 0.2 mg | 135° F. | 30° F. |
| Oil # 2 | 65.4 mg | 0.1 mg | 58° F. | 5° F. |
| Oil # 3 | 62.3 mg | 0.1 mg | 127° F. | 68° F. |

[1]Unprocessed oils had not been processed according to the defouling and dechlorination process of this invention, but may have been previously dewatered.
[2]Tested at 550° F. tube temperature with commercial anti-foulant chemicals. The remaining tests above were conducted at 750° F. tube temperature without anti-foulant chemicals.

To further corroborate that the significant temperature drop in Metalworking Oil #3, even after treatment, was due to loosely adhering deposits which would not present significant difficulties in production operations, the before and after tests of Metalworking Oil #3 were repeated with commercial antifoulant chemicals. First, prior to the test, the tube was pretreated with 3 cc's per minute of a 2500 ppm solution of Nalco/Exxon Energy Chemicals EC5425A, a surface active antifoulant comprised of amine alkyl phosphate salts, for one hour at 650 F. Then 50 ppm of EC5425A and 150 ppm of Nalco/Exxon Energy Chemicals 94BU260, a glycol ether and polyolefin ester dispersant, were added to two samples prior to testing them on the pretreated tubes. The results are shown below:

| | Three Hour Thermal Fouling Test at 750 F. Tube Temperature and 1cc per Minute Flow | | | |
| --- | --- | --- | --- | --- |
| | Thermal Fouling Test Tube Weight Gain | | Thermal Fouling Test Delta T (F.) | |
| Sample | Unprocessed Oil[3] | Defouled Oil | Unprocessed Oil[3] | Defouled Oil |
| Metalworking Oil # 3 | 15.3 mg | 0.1 mg | 180° F.[4] | 17–20° F.[5] |

[3]Unprocessed oils had not been processed according to the de-fouling and de-chlorination process of this invention, but had previously de-watered and chemically treated with commercial anti-foulants as discussed above.
[4]Higher than without anti-foulant chemicals.
[5]Range over separate iterations of test. Tube weight gain was 0.1 mg for both iterations.

The remaining 17 to 20 degree temperature drop still experienced is expected to decline further to negligible levels in a turbulent flow production environment, given the virtual absence of tenacious deposits that remain following the heptane rinse.

The synergistic effect of concurrent thermal and gas treatment is illustrated by the following comparison with the antifouling effect of three hour thermal treatment at 525 F alone:

Three Hour Thermal Fouling Test at 750 F.
Tube Temperature and 1cc per Minute Flow

| Sample | Thermal Fouling Test Tube Weight Gain | | Thermal Fouling Test Delta T (F.) | |
|---|---|---|---|---|
| | Thermal Treatment Only | Thermal and Gas Treatment | Thermal Treatment Only | Thermal and Gas Treatment |
| Crankcase | | | | |
| Oil # 1 | 3.1 mg | 0.1 mg | 52° F. | 3° F. |
| Oil # 4 | 13.4 mg | 0.5 mg[6] | 60° F. | 58° F.[6] |

[6]The thermal and gas treatment run of crankcase oil #4 was interrupted prior to completion due to equipment malfunction, but none-the-lesss provided marked improvement over conventional thermal treatment noted with respect to tube weight gain.

To provide another point of reference at lower temperatures, another test sample was alternatively subjected to 1 ½ hours of thermal treatment or 1 ½ hours of thermal and gas treatment at 425 F prior to being tested in the Alcor unit at a 550 F tube temperature. In addition, the Alcor tubes were pretreated with EC 5425A and both EC5425A and 94BU260 were added to the oils as antifoulants, employing the same quantities and procedures discussed above with in connection with Metalworking Oil #3:

Three Hour Thermal Fouling Test at 550 F.
Tube Temperature and 1cc per Minute Flow

| Sample | Thermal Fouling Test Tube Weight Gain | | Thermal Fouling Test Delta T (F.) | |
|---|---|---|---|---|
| | Thermal Treatment Only | Thermal and Gas Treatment | Thermal Treatment Only | Thermal and Gas Treatment |
| Metalworking Oil # 4 | 8.0 mg | 0.9 mg | 19° F. | 41° F. |

The comparisons with respect to tube weight gain, which is indicative of tenacious deposits which do not readily rinse free, markedly favor the present invention process, and are noteworthy given that thermal treatment alone is a state of the art process set forth, with minor variations, in U.S. Pat. Nos. such as 5,447,628, 5,306,419 and 4,512,878.

Other samples, we have found, can be adequately de-fouled by three hour 525 F thermal treatment alone. In such instances, the innovative process of the present invention provides fully comparable results:

Three Hour Thermal Fouling Test at 750 F.
Tube Temperature and 1cc per Minute Flow

| Sample | Thermal Fouling Test Tube Weight Gain | | Thermal Fouling Test Delta T (F.) | |
|---|---|---|---|---|
| | Thermal Treatment Only | Thermal and Gas Treatment | Thermal Treatment Only | Thermal and Gas Treatment |
| Crankcase Oil # 2 | 0.3 mg | 0.3 mg | 5° F. | 5° F. |

Combining chemical treatment with diammonium phosphate (DAP) with subsequent thermal treatment, as is suggested in U.S. Pat. Nos. 4,247,389, 4,381,992, and 4,420,389 also produced far inferior results on the one sample tested to the typical response of the present process with respect to tube weight gain:

Three Hour Thermal Fouling Test at 550 F.
Tube Temperature and 1cc per Minute Flow

| Sample | Thermal Fouling Test Tube Weight Gain DAP and Thermal Treatment | Thermal Fouling Test Delta T (F.) DAP and Thermal Treatment |
|---|---|---|
| Crankcase Oil # 5 | 5.6 mg | 17° F. |

The invention process is equally successful in reducing chlorine content, particularly chlorine content arising from chlorinated paraffins. This is particularly remarkable in that the chlorine reduction occurs concurrently with the antifouling benefits of the invention. Several samples processed according to this procedure were used metalworking oils high in chlorinated paraffins:

| Sample | ppm Chlorine before Processing | ppm Chlorine after Processing | % Reduction |
|---|---|---|---|
| Metalworking | | | |
| Oil # 1 | 8800 ppm | 500 ppm | 94.3% |
| Oil # 2 | 5200 ppm | 300 ppm | 94.2% |
| Oil # 3 | 8900 ppm | 300 ppm | 96.6% |

The chlorine removed from used oils appears to evolve overhead substantially as HCl. In several iterations of the process, a laboratory direct contact condenser apparatus was used wherein cooling and neutralization water was re-circulated with a pump to condense and neutralize the overhead vapors. In this apparatus, the pH of the cooling and neutralizing water was tracked to ascertain when the HCl evolved overhead. From these iterations, it appears that substantially all the chlorine evolved as HCl was evolved within a fifteen (15) minute period after effective de-chlorination treatment temperatures were reached, and that substantial evolution occurred within several minutes. Hence, to the extent the dechlorination of the oil tracks the progression of the defouling (which is believed to be the case), substantial defouling is believed to have occurred likewise within several minutes of gas contact.

Stage 2: Vacuum Distillation

In several iterations of the above procedure, the two liter flask contents following stage one were allowed to cool below 300 F (solely to prevent exposure to the atmosphere at oxidizing temperatures, a step not required in a closed system) and poured into a five liter vacuum distillation flask and distilled under approximately 1 mm Hg crossbar vacuum through a 19 inch long two inch diameter distillation column packed with 6 mm porcelain Berl Saddles and insulated with several layers of heavy duty aluminum foil. Heating was via upper and lower electric mantles applied to the distillation flask and controlled via a variable transformer to maintain flask pressure below 20 mm Hg and thus preclude the possibility of column flooding. The oil distilling in the below the base oil distillation range up to 650 F atmospheric equivalent (or up to 300 F at 1 mm Hg), was collected and set aside, and a new collection flask mounted, taking care to maintain vacuum throughout to prevent oxygen damage to the oil. Distillation was continued until the flask temperature had reached 690 F (well above temperatures previously assumed to cause unacceptable cracking with used oil), at which point the crossbar temperature had reached 840 F atmospheric equivalent (450 F at 1 mm). A higher maximum atmospheric equivalent distillation temperature can be anticipated from a production vacuum unit, which would normally operate continuously with steam drive. The distillation receiver containing the base lube distillate was then removed for testing.

There was no evidence of fouling of the test distillation apparatus throughout the procedure, nor in subsequent iterations of a similar protocol in which generally comparable equipment and 0.24" PRO-PAK protruded metal distillation packing were employed. Distillate characteristics were consistent with a de-ashed fuel of high quality, approximating #2 oil but with higher viscosity, and immediately or after minor blending suitable for many off road diesel and fuel oil markets, as well as an excellent feed to a hydrofinisher or other base oil finishing process such as the solvent extraction process set forth in our co-pending application, Ser. No. 08/925,279 filed Sep. 8, 1997.

What is claimed is:

1. A method for reducing the propensity of oil to foul, comprising the steps of
   heating a quantity of said oil to a temperature in the range of approximately 400 F to 700 F,
   maintaining said oil within said temperature range for an average residence time of no less than several minutes
   contacting said heated oil with a substantially non-oxidizing gas during said residence time.

2. A method as in claim 1 wherein the oil is a used oil.

3. A method as in claim 2 comprising the additional step of:
   reducing oil portions carried overhead by said contacting step.

4. A method as in claim 3 wherein said reducing step is performed by operating said method at a pressure exceeding approximately 5 psig above atmospheric pressure.

5. A method as in claim 3 wherein said reducing step is accomplished using a contactor through which said oil portions carried overhead are passed.

6. A method as in claim 3 comprising the additional step of:
   condensing said overhead oil portions using a direct contact condenser.

7. A method as in claim 2 comprising the additional step of:
   removing substantially all water and light fuel, having a boiling point below about 300 F at atmospheric pressure, at least a portion of any commercial solvent, and of glycol contamination prior to said heating step.

8. A method as in claim 7 wherein said removing step is accomplished using a distillation process.

9. A method as in claim 8 comprising the additional step of:
   burning a substantial portion of said water, light fuel, commercial solvents, and glycols for energy recovery without condensation.

10. A method as in claim 2 comprising the additional step of:
    removing substantially all water from said quantity of oil prior to said heating step using a distillation process,
    burning a substantial portion of said water and any fuel removed therewith, without condensation.

11. A method as in claim 2 comprising the additional step of:
    maintaining a condensable oil component of oil portions carried overhead by said contacting step at a temperature above approximately 400 F for a period of time exceeding several minutes at higher than atmospheric pressure.

12. A method as in claim 2 comprising the additional step of:
    returning a condensable component of oil portions carried overhead by said contacting step into said quantity of heated oil.

13. A method as in claim 2 comprising the additional step of:
    vacuum distilling said quantity of oil following said contacting step in a vacuum column to produce at least one distillate fraction and a heavier residue.

14. A method as in claim 13 wherein said vacuum distilling step occurs with an absolute flash zone pressure of at least approximately 10 mm Hg.

15. A method as in claim 13 wherein a partial pressure of said oil is reduced below its absolute pressure during said vacuum distilling step.

16. A method as in claim 13 comprising the additional step of:
    finishing a portion of said at least one distillate fraction to a base oil using a solvent extraction process.

17. A method as in claim 1 wherein the contacting gas is substantially comprised of steam.

18. A method as in claim 2 wherein the contacting gas is substantially comprised of steam.

19. A method as in claim 18 comprising the additional step of:
    condensing a portion of said steam for reuse.

20. A method as in claim 2 comprising the additional step of:
    breaking up bubbles in said quantity of oil from said gas contacting step.

21. A method as in claim 20 wherein said breaking step is performed using physical agitation of at least a portion of said quantity of oil.

22. A method as in claim 20 wherein said breaking step is performed using the application of sonic energy to at least a portion of said quantity of oil.

23. A method as in claim 2, comprising the additional step of:
    agitating at least a portion of said quantity of oil.

24. A method for reducing the chlorine content of chlorinated oil, comprising the steps of:
    heating a quantity of said oil to a temperature in the range of approximately 400 F to 700 F,
    maintaining said oil within said temperature range for an average residence time of no less than several minutes,
    contacting said heated oil with steam during said residence time.

25. A method for reducing the propensity of used oil to foul, comprising the steps of:
    heating a quantity of said used oil to a temperature in the range of approximately 400 F to 700 F,
    maintaining said used oil within said temperature range for an average residence time of no less than several minutes,
    contacting said heated used oil with a substantially non-oxidizing gas during said residence time.

26. A method for reducing the propensity of used oil to foul, comprising the steps of:
  removing from a quantity of said used oil substantially all water and light fuel, having a boiling point below about 300 F at atmospheric pressure, and at least a portion of any commercial solvent, and glycol contamination,
  heating said quantity of said used oil to a temperature in the range of approximately 400 F to 700 F,
  maintaining said quantity of said used oil within said temperature range for an average residence time of no less than several minutes,
  contacting said quantity of used oil with a substantially non-oxidizing gas during said residence time.

27. A method for reducing the propensity of used oil to foul, comprising the steps of:
  removing substantially all water from a quantity of said used oil using a distillation process,
  burning a substantial portion of said water and any fuel removed therewith, without condensation,
  heating a quantity of said used oil to a temperature in the range of approximately 400 F to 700 F,
  maintaining said used oil within said temperature range for an average residence time of no less than several minutes,
  contacting said heated oil with a substantially non-oxidizing gas during said residence time.

28. A method for reducing the propensity of used oil to foul, comprising the steps of:
  heating a quantity of said used oil to a temperature in the range of approximately 400 F to 700 F,
  maintaining said used oil within said temperature range for an average residence time of no less than several minutes,
  contacting said heated used oil with a substantially non-oxidizing gas during said residence time,
  vacuum distilling at least a portion of said quantity of used oil in a vacuum column to produce at least one distillate fraction and a heavier residue.

29. A method for reducing the propensity of used oil to foul, comprising the steps of:
  heating a quantity of said used oil to a temperature in the range of approximately 400 F to 700 F,
  maintaining said used oil within said temperature range for an average residence time of no less than several minutes,
  contacting said heated used oil with a substantially non-oxidizing gas during said residence time,
  vacuum distilling at least a portion of said quantity of used oil in a vacuum column to produce at least one distillate fraction and a heavier residue, wherein a partial pressure of said used oil is reduced below its absolute pressure during said vacuum distilling step.

30. A method for reducing the propensity of used oil to foul, comprising the steps of:
  heating a quantity of said used oil to a temperature in the range of approximately 400 F to 700 F,
  maintaining said used oil within said temperature range for an average residence time of no less than several minutes,
  contacting said heated used oil with a substantially non-oxidizing gas during said residence time,
  vacuum distilling at least a portion of said quantity of used oil in a vacuum column to produce at least one distillate fraction and a heavier residue,
  finishing at least a portion of said at least one distillate fraction to a base oil using a solvent extraction process.

31. A method for reducing the propensity of used oil to foul, comprising the steps of:
  heating a quantity of said used oil to a temperature in the range of approximately 400 F to 700 F,
  maintaining said used oil within said temperature range for an average residence time of no less than several minutes,
  contacting said heated used oil with a substantially non-oxidizing gas during said residence time,
  breaking up bubbles in said used oil during said gas contacting step.

32. A method for reducing the propensity of used oil to foul, comprising the steps of:
  heating a quantity of said used oil to a temperature in the range of approximately 400 F to 700 F,
  maintaining said used oil within said temperature range for an average residence time of no less than several minutes, wherein at least two sequential reactors accomplish said step of maintaining,
  contacting said heated used oil with a substantially non-oxidizing gas during said residence time.

33. A method as in claim 32, wherein at least two sequential reactors accomplish said step of contacting.

34. A method for reducing the propensity of used oil to foul, comprising the steps of:
  heating a quantity of said used oil to a temperature in the range of approximately 400 F to 700 F,
  maintaining said used oil within said temperature range for an average residence time of no less than fifteen minutes,
  contacting said heated used oil with a substantially non-oxidizing gas during said residence time.

35. A method for reducing the propensity of used oil to foul, comprising the steps of:
  removing from a quantity of said used oil substantially all water and light fuel, having a boiling point below about 300 F at atmospheric pressure, and at least a portion of any commercial solvent, and glycol contamination,
  heating said quantity of said used oil to a temperature in the range of approximately 400 F to 700 F,
  maintaining said quantity of said used oil within said temperature range for an average residence time of no less than fifteen minutes,
  contacting said quantity of used oil with a substantially non-oxidizing gas during said residence time.

36. A method for reducing the propensity of used oil to foul, comprising the steps of:
  removing substantially all water from a quantity of said used oil using a distillation process,
  burning a substantial portion of said water and any fuel removed therewith, without condensation,
  heating a quantity of said used oil to a temperature in the range of approximately 400 F to 700 F,
  maintaining said used oil within said temperature range for an average residence time of no less than fifteen minutes,
  contacting said heated oil with a substantially non-oxidizing gas during said residence time.

37. A method for reducing the propensity of used oil to foul, comprising the steps of:
  heating a quantity of said used oil to a temperature in the range of approximately 400 F to 700 F, maintaining said used oil within said temperature range for an average residence time of no less than fifteen minutes, contacting said heated used oil with a substantially non-oxidizing gas during said residence time, vacuum distilling at least a portion of said quantity of used oil in a vacuum column to produce at least one distillate fraction and a heavier residue.

38. A method for reducing the propensity of used oil to foul, comprising the steps of:

heating a quantity of said used oil to a temperature in the range of approximately 400 F to 700 F, maintaining said used oil within said temperature range for an average residence time of no less than fifteen minutes, contacting said heated used oil with a substantially non-oxidizing gas during said residence time, vacuum distilling at least a portion of said quantity of used oil in a vacuum column to produce at least one distillate fraction and a heavier residue, wherein a partial pressure of said used oil is reduced below its absolute pressure during said vacuum distilling step.

39. A method for reducing the propensity of used oil to foul, comprising the steps of:

heating a quantity of said used oil to a temperature in the range of approximately 400 F to 700 F, maintaining said used oil within said temperature range for an average residence time of no less than fifteen minutes, contacting said heated used oil with a substantially non-oxidizing gas during said residence time, vacuum distilling at least a portion of said quantity of used oil in a vacuum column to produce at least one distillate fraction and a heavier residue, finishing at least a portion of said at least one distillate fraction to a base oil using a solvent extraction process.

40. A method for reducing the propensity of used oil to foul, comprising the steps of:

heating a quantity of said used oil to a temperature in the range of approximately 400 F to 700 F, maintaining said used oil within said temperature range for an average residence time of no less than fifteen minutes, contacting said heated used oil with a substantially non-oxidizing gas during said residence time, breaking up bubbles in said used oil during said gas contacting step.

41. A method for reducing the propensity of used oil to foul, comprising the steps of:

heating a quantity of said used oil to a temperature in the range of approximately 400 F to 700 F, maintaining said used oil within said temperature range for an average residence time of no less than fifteen minutes, wherein at least two sequential reactors accomplish said step of maintaining, contacting said heated used oil with a substantially non-oxidizing gas during said residence time.

42. A method as in claim 41, wherein at least two sequential reactors accomplish said step of contacting.

* * * * *